United States Patent [19]

Sakashita et al.

[11] Patent Number: 5,796,200
[45] Date of Patent: Aug. 18, 1998

[54] BRUSHLESS MOTOR HAVING AN ANISOTROPIC DRIVING MAGNET AND AN ISOTROPIC FREQUENCY MAGNET

[75] Inventors: Hiroshi Sakashita; Masayuki Katagiri, both of Nagano, Japan

[73] Assignee: Kabushiki Kaisha Sankyo Seiki Seisakusho, Nagano, Japan

[21] Appl. No.: 516,938

[22] Filed: Aug. 18, 1995

[30] Foreign Application Priority Data

Aug. 22, 1994 [JP] Japan .................................. 6-220933

[51] Int. Cl.$^6$ .................................................. H02K 21/12
[52] U.S. Cl. ..................... 310/156; 310/67 R; 310/68 R; 29/596; 29/598
[58] Field of Search ............................... 310/156, 68 R, 310/67 R; 335/302; 29/596, 598

[56] References Cited

U.S. PATENT DOCUMENTS

| | | | |
|---|---|---|---|
| 3,784,945 | 1/1974 | Baermann | 335/302 |
| 4,302,692 | 11/1981 | Matsumoto et al. | 310/113 |
| 4,570,093 | 2/1986 | Morii et al. | 410/46 |
| 4,587,450 | 5/1986 | Ozaki | 310/156 |
| 4,835,505 | 5/1989 | Hattori et al. | 335/302 |
| 4,888,506 | 12/1989 | Umehera et al. | 310/13 |
| 4,948,999 | 8/1990 | Bertram et al. | 310/162 |
| 5,126,317 | 6/1992 | Agarwala | 505/1 |

FOREIGN PATENT DOCUMENTS

A4 35888  6/1992  Japan .................................. 310/156

*Primary Examiner*—Steven L. Stephan
*Assistant Examiner*—Elvin G. Enad
*Attorney, Agent, or Firm*—Sughrue, Mion, Zinn, Macpeak & Seas, PLLC

[57] ABSTRACT

In a brushless motor, its magnet unit is formed by laying on each other a first magnet made of a flexible bond magnet material which is anisotropic and a second magnet made of a flexible bond magnet material which is isotropic, and the second magnet is smaller in wall thickness than the first magnet, and is confronted with the stator and the magneto-electric conversion element.

16 Claims, 5 Drawing Sheets

BRUSHLESS MOTOR HAVING AN ANISOTROPIC DRIVING MAGNET AND AN ISOTROPIC FREQUENCY MAGNET

BACKGROUND OF THE INVENTION

1. Field of the Invention

This invention relates to a brush less motor which employs a magnet unit which comprises a rotor driving magnet for driving the rotor and a frequency generating magnet for generating a frequency signal.

2. Related Art

A conventional brushless motor is generally designed as follows: It has a frequency generating magnet for detecting the rotation of the motor, and a magneto-electric conversion element for detecting the magnetic flux of the frequency generating magnet. In the motor, the output of the magneto-electric conversion element is utilized to detect a signal having a frequency proportional to the speed of rotation of the motor, thereby to control the speed of rotation of the latter.

FIG. 10 shows a conventional brushless motor of this type; more specifically, it shows the right half of the motor with respect to the central axis X—X thereof.

As shown in FIG. 10, a bearing holder 2 like a cylinder is mounted on a circuit board 1 substantially at the center in such a manner that it is extended downwardly through a central hole formed in the circuit board 1. The bearing holder 2 has an annular flange on its outer periphery. A stator core 5 is fixedly mounted on the flange of the bearing holder 2 with screws or the like. The stator core 5 has a plurality of protruded poles which are radially outwardly extended. A drive coil 6 is wound on the protruded poles of the stator core 5. The drive coil 6 is connected to a drive circuit formed on the circuit board 1 so that it is excited as required.

The bearing holder 2 has a cylindrical hole extended along its central axis, and upper and lower bearings 3 and 3 are fitted in the upper and lower end portions of the cylindrical hole of the bearing holder 2, respectively, thus rotatably supporting a rotary shaft 4. A substantially cup-shaped rotor casing 7 is fixedly mounted on the upper end portion of the rotary shaft 4. The rotor casing 7 has an annular wall, on the inner cylindrical surface of which an annular drive magnet 8 is fixedly mounted in such a manner that its inner cylindrical surface is confronted with the outer cylindrical surface of the stator core 5 through a predetermined gap. A frequency generating magnet 9 (separate from the above-described drive magnet) is mounted on the outer cylindrical surface of the cylindrical wall of the rotor casing 7 in such a manner that the outer cylindrical surface of the frequency generating magnet 9 is confronted through a predetermined gap with a magneto-electric conversion element 10 mounted on the circuit board 1.

The magneto-electric conversion element 10 outputs a frequency signal whose frequency is in proportion to the speed of rotation of the motor. The frequency signal of the magneto-electric conversion element 10 is utilized to control the speed of the motor in the conventional manner. That is, the drive coil 6 is excited according to the frequency signal, so that the drive magnet 8 is energized, whereby the rotor casing 7 together with the rotary shaft 4 is rotated.

In the conventional brushless motor, as shown in FIG. 10, the drive magnet 8 and the frequency generating magnet 9 are separate from each other, being separate components. Hence, in manufacture of those magnets 8 and 9 , it is possible to allow them to have required characteristics.

However, in the brushless motor having the drive magnet 8 and the frequency generating magnet 9 as separate components, those magnets are different in manufacturing method and in manufacturing process from each other; that is, they are manufactured separately, which results in an increase in manufacturing cost of the brushless motor.

In order to overcome this difficulty, a brushless motor as shown in FIG. 11 has been proposed in the art. In the motor, the drive magnet and the frequency generating magnet are provided as one magnet unit which is formed by using an isotropic or anisotropic plastic magnet material. That is, the magnet unit 11 includes a magnet 11a in its inner cylindrical surface which serves as the drive magnet, and a magnet 11b in its outer cylindrical surface which serves as the frequency generating magnet. The remaining structures are equal to those of the brushless motor shown in FIG. 10.

In the case of the brushless motor shown in FIG. 11, the drive magnet and the frequency generating magnet, being provided as one magnet unit, can be formed in one manufacturing process. However, the manufacture of the brushless motor involves the following problem: Since the magnetic unit is formed by using the plastic magnet material, it is necessary to perform a resin molding operation in the manufacturing process, which means that the brushless motor cannot be manufactured without large-scale manufacturing equipment. Thus, the manufacturing cost of the brushless motor is not so lower than that of the brushless motor shown in FIG. 10.

Furthermore, as was described above, in the brushless motor shown in FIG. 11, the drive magnet and the frequency generating magnet are formed into one magnet unit by using one and the same magnet material. Hence, it is impossible for the drive magnet and the frequency generating magnet to have their own characteristics. In practice, the characteristic of the drive magnet leans towards that of the frequency generating magnet, or vice versa; or the characteristic of each of those magnets is somewhere between their required characteristics. This obstructs the improvement in performance of the brushless motor.

SUMMARY OF THE INVENTION

Accordingly, an object of the invention is to eliminate the above-described difficulties accompanying a conventional brushless motor. More specifically, an object of the invention is to provide a brushless motor which employs magnets whose characteristics are suitable for driving the motor and for generating a frequency signal, respectively, thus being improved in output characteristic and in FG (frequency generating) characteristic; i.e., in performance, and which can be manufactured with high efficiency.

According to an aspect of the present invention, there is provided a brushless motor comprising: a magnet unit mounted on a rotor casing, said magnet being rotated together with said rotor casing; and a stator and a magneto-electric conversion element arranged confronted with said magnet unit, wherein said magnet unit is formed by laying on each other a first magnet made of a flexible bond magnet material which is anisotropic and a second magnet made of a flexible bond magnet material which is isotropic, and said second magnet is smaller in wall thickness than said first magnet, and is confronted with said stator and said magneto-electric conversion element.

As was described above, in the brushless motor of the invention, the magnet unit is made of the flexible bond magnet material; more specifically, it is formed by laying on each other the first magnet which is anisotropic and can be readily magnetized with the aid of a ferromagnetic force and the second magnet which is isotropic and can be readily magnetized with a fine magnetizing pitch, and the second magnet is smaller in wall thickness than the first magnet. Hence, in the invention, the first magnet is magnetized with the ferromagnetic force for the purpose of driving the rotor, and the second magnet is magnetized with a fine magnetizing pitch for the purpose of generating a frequency signal. That is, the characteristic of the first magnet is suitable for driving the rotor, and that of the second magnet is suitable for generating a frequency signal. Hence, the resultant brushless motor is excellent in output characteristic and in FG characteristic, and can be manufactured with high efficiency.

In the brushless motor of the invention, although the second magnet is confronted with the stator core, the wall thickness of the second magnet is set to a predetermined value smaller than that of the first magnet. That is, the wall thickness of the second magnet can be so selected that the magnetic flux of the first magnet is scarcely affected by the second magnet. Hence, the brushless motor is able to provide a sufficiently high driving force.

In the invention, in the formation of the magnet unit, the mixture is used which is prepared by kneading the magnet material together with the epoxy resin material, and the magnet unit made of the mixture is subjected to heat treatment. Hence, the resultant magnet unit thus processed is scarcely deformed by the change in temperature. The epoxy resin material is employed for fixing the magnet unit.

DETAILED DESCRIPTION OF THE PREFERRED EMBODIMENTS

Figure 8:
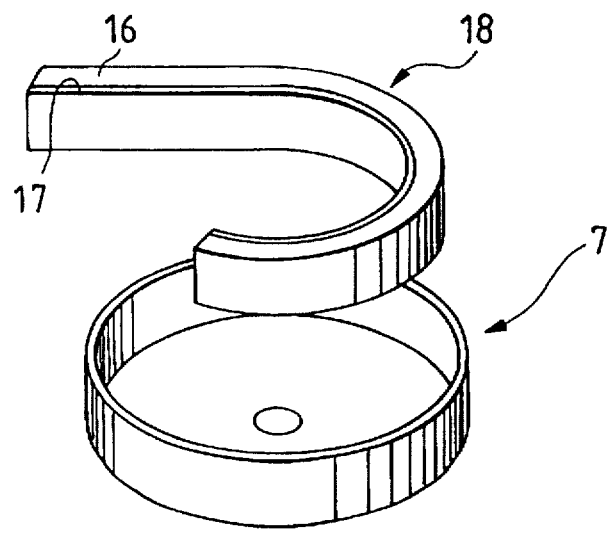
Figure 9:
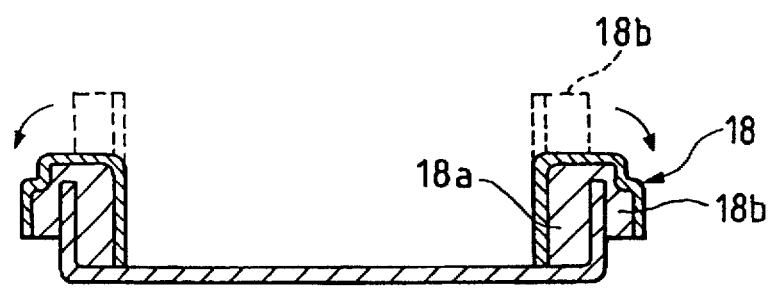
Figure 10:
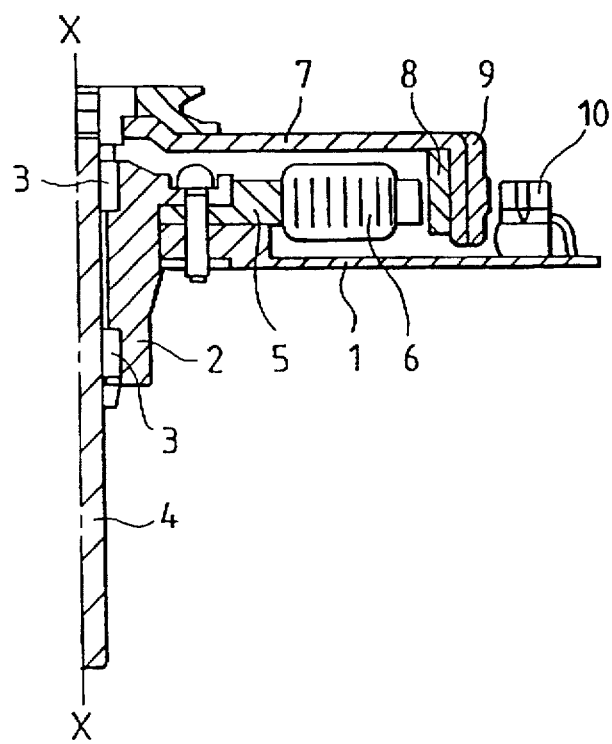
FIGS. 10 and 11 are sectional views showing examples of a conventional brushless motor.
Figure 11:
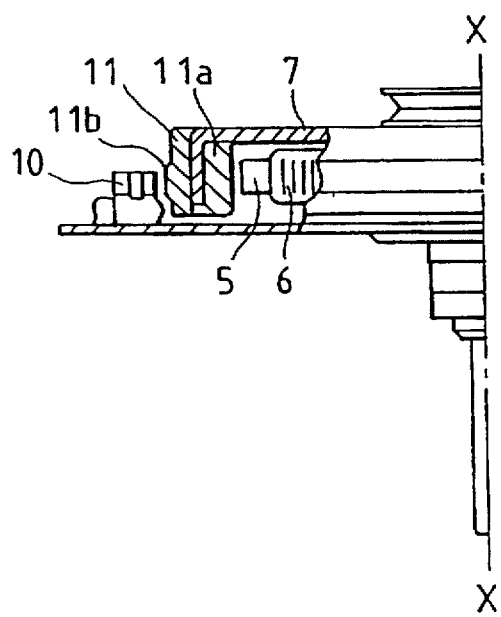

The invention will be described with reference to its preferred embodiments shown in FIGS. 1 through 9, in which parts corresponding functionally to those already described with reference to FIG. 10 are therefore designated by the same reference numerals or characters.

Figure 1:
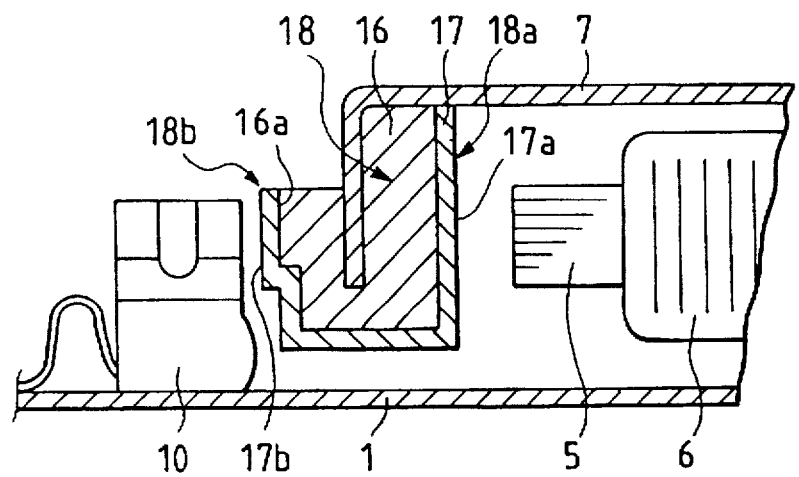
FIG. 1 is a sectional view showing essential components of an example of a brushless motor, which constitutes a first embodiment of the invention.
Figure 2:
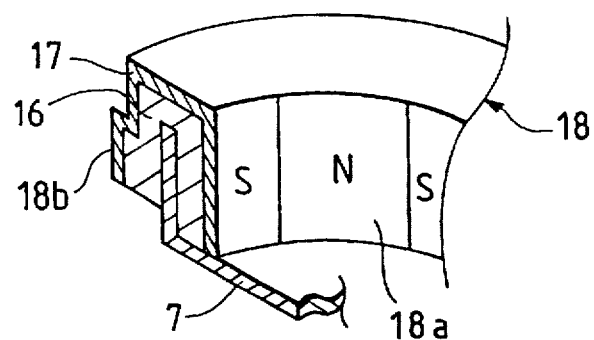
FIG. 2 is a perspective view, with parts cut away, showing an magnet unit and a rotor casing in the brushless motor illustrated in FIG. 1.
Figure 3:
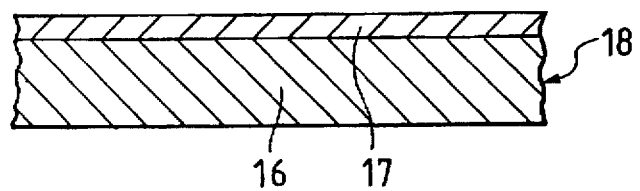
FIG. 3 is a sectional view of the magnet unit shown in FIGS. 1 and 2.

FIGS. 1 through 3 show an example of a brushless motor, which constitutes a first embodiment of the invention.

In the brushless motor, as shown in FIGS. 1 through 3, an annular magnet unit 18 is mounted on the cylindrical wall of a substantially cup-shaped rotor casing 7. The magnet unit 18 is formed by using a flexible bond magnet material; more specifically, it is formed by laying first and second magnets 16 and 17 on each other.

The flexible bond magnet material is formed as follows: A magnetic powder is mixed with an organic binder having a rubber-like elasticity, or a magnetic powder is mixed with a binder which is prepared by adding an additive to a rubber material or a synthetic resin material having a rubber-like elasticity. This method of preparing the flexible bond magnet material is well known in the art, being disclosed, for instance, by Unexamined Japanese Patent Application No. 164314/1985. For more information on the method, it is requested to refer to the specification thereof.

The first magnet 16 is fixed to the inner and outer cylindrical surfaces of the cylindrical wall of the rotor casing 7. The first magnet 16 includes an annular protrusion 16a which is formed on the outer cylindrical surface of the first magnet 16 in such a manner that it is radially outwardly extended therefrom. The first magnet is an anisotropic magnet which is readily magnetized by a ferromagnetic force and is able to provide a great drive force. In the case of the first magnet, the direction of ferromagnetic force is perpendicular to the inner cylindrical surface of the rotor casing 7 similarly as in the ordinary case. In the embodiment, the first magnet 16 is formed by rolling an anisotropic magnet material. That is, a mixture is formed by mixing a magnetic powder FS-317 manufactured by "Toda Kogyo" which is an anisotropic strontium ferrite with a rubber material serving as a binder or a binder having a rubber-like elasticity to a magnetic powder filling rate of 85% to 95%. The mixture thus prepared is rolled to form the first magnet.

The second magnet 17 is laid over the outer surface of the first magnet 16; more specifically, it covers the latter 16 from the inner cylindrical surface through the lower end face (shown as the upper end face in FIG. 2) of the first magnet 16 up to the outer cylindrical surface of the annular protrusion 16a. The second magnet 17 is smaller in wall thickness than the first magnet 16, being in a range of from 0.1 mm to 0.5 mm.

The second magnet 17 is an isotropic magnet which, being fine in magnetic powder size, can be magnetized with an extremely fine magnetizing pitch. In the embodiment, the second magnet 17 is formed by rolling an isotropic magnet material over the first magnet 16. That is, a mixture is prepared by mixing a magnetic powder GP-500 manufactured by "Toda Kogyo" with a rubber material or a binder having a rubber-like elasticity to a magnetic powder filling rate of 85% to 95%. The mixture thus prepared is rolled over the first magnet, and then subjected to heat treatment. The inner cylindrical surface 17a of the second magnet 17 is confronted through a predetermined gap with the outer cylindrical surface of the stator core 5, and its outermost cylindrical surface 17b which is radially outwardly protruded is confronted through a predetermined gap with a magneto-electric conversion element 10 mounted on a circuit substrate 1.

The magnet unit 18 is magnetized as follows: That is, it is magnetized from the side of the inner cylindrical surface 18a for the purpose of driving the rotor, and from the side of the outer cylindrical surface 18b for the purpose of generating a frequency signal to detect the rotation of the motor.

Now, the reason why the thickness of the second magnet is set in a range of from 0.1 mm to 0.5 mm will be described with reference to FIG. 4.

Figure 4:
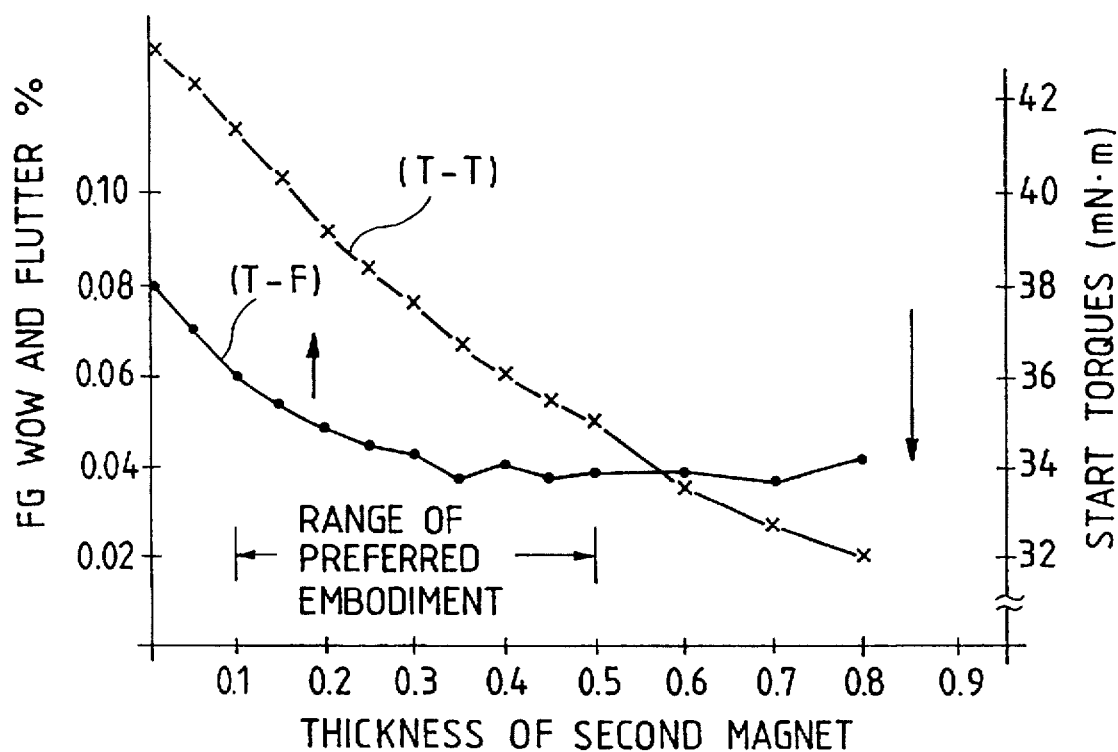
FIG. 4 is a graphical representation indicating FG wow and flutter rates and start torques with variations in wall thickness of a second magnet in the first embodiment.

In FIG. 4, the curve T-F indicates FG wow and flutter rates (%) with variations in wall thickness of the second magnet.

More specifically, the curve T-F is obtained by measuring the FG output which is provided when the motor is driven at 1000 rpm while the wall thickness of the second magnet is varied. Further in FIG. 4, the curve T—T indicates motor start torques with variations in wall thickness of the second magnet.

In the brushless motor of the invention, the rotor driving first magnet 16 and the frequency generating second magnet 17 are laid on each other. Hence, the effect of one of the first and second magnets on the other must be taken into consideration. As is apparent from FIG. 4, as the second magnet 17 is increased in wall thickness, the effect of the anisotropic magnet (i.e., the first magnet) is decreased, and the FG wow and flutter rate is decreased; that is, the FG wow and flutter characteristic is improved. However, when the wall thickness exceeds a certain value (about 0.3 mm in FIG. 4), the FG wow and flutter characteristic is no longer improved.

On the other hand, the second magnet 17 covers the outer surface of the first magnet 16. Hence, as the second magnet 17 is increased in wall thickness, the magnetic flux of the anisotropic magnet (i.e., the first magnet 16) is gradually blocked, so that as indicated by the curve T—T in FIG. 4 the motor start torque is gradually decreased.

Therefore, the wall thickness of the second magnet 17 is set in a range of from 0.1 mm to 0.5 mm with which both the FG wow and flutter characteristic and the motor start torque are satisfactory. In other words, with the wall thickness ranged from 0.1 mm to 0.5 mm, the FG wow and flutter characteristic is maintained satisfactory, and the motor start torque is substantially maintained unchanged.

In the case where, as was described above, the first magnet 16 is magnetized for the purpose of driving the rotor through the second magnet, ferromagnetic magnetization is given to the magnet unit with the aid of a ferromagnetic force. Hence, in this operation, the first magnet 16 is magnetized through the second magnet 17. And, with the wall thickness of the second magnet 17 in the above-described range, the drive force provided by the first magnet 16 is substantially maintained unchanged.

On the other hand, as was described before, the second magnet 17 is magnetized for the purpose of generating a frequency signal. However, the magnetization is made with a fine magnetizing pitch, not using a ferromagnetic force. Therefore, the magnetization scarcely reaches the first magnet; that is, the magnetic flux hardly affects the first magnet. Thus, the resultant magnet unit has been uniformly magnetized, thus providing a stable magnetic output.

A method of manufacturing the above-described magnet unit 18 will be described with reference to FIGS. 6 through 9.

Figure 6:
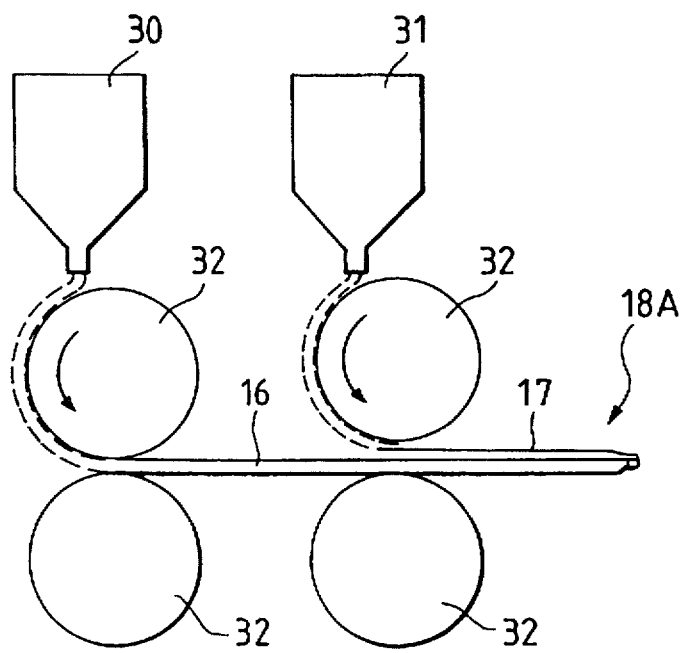
FIGS. 6 through 9 are explanatory diagrams showing steps of manufacturing the magnet unit in the above-described first embodiment.

First, as shown in FIG. 6, an anisotropic magnetic powder and a binder, which are used to form the first magnet 16, are kneaded with a kneading machine 30 to prepare a mixture of them. The mixture thus prepared is rolled with a pair of rollers 32 and 32, so that a sheet-shaped first magnet is formed. Next, an isotropic magnetic powder and a binder, which are used to form the second magnet 17, are kneaded with another kneading machine 31 to form a mixture of them. The mixture thus formed is rolled with another pair of rollers 32 and 32, so that a sheet-shaped second magnet is formed and laid on one side of the sheet-shaped first magnet. Thus, the two layers of magnets, namely, the sheet-shaped first magnet and the sheet-shaped second magnet laid over the former are heat-treated with predetermined heat-treating means until a rolled sheet-shaped magnet unit 18A is obtained.

In the above-described manufacturing step, the material for forming the first magnet and/or the material for forming the second magnet may be mixed with an epoxy resin material. The mixture thus prepared is fixedly applied onto the rotor casing, and then solidified by heating, to form the magnet unit. The magnet unit thus formed is scarcely deformed by the change in temperature. The epoxy resin material may be employed for fixing the magnet unit. The step of forming the first magnet, and the step of forming the second magnet may be effected successively, or independently of each other.

Figure 7:
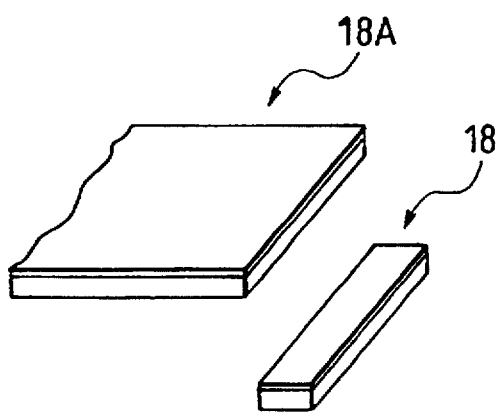

As shown in FIG. 7, the sheet-shaped magnet unit 18A is cut to a predetermined length, to form a belt-shaped magnet unit 18. Thereafter, as shown in FIG. 8, the magnet unit 18 thus formed is fixed in the rotor casing 7 in such a manner that the second magnet 17 comes inside the first magnet 16.

Where the magnet unit 18 is merely fixed in the rotor casing 7 in the above-described manner, its end portion 18b is protruded from the rotor casing 7 as indicated by the dotted line in FIG. 9. The end portion 18b thus protruded is folded over the cylindrical wall of the rotor casing 7 with a jig (not shown) until it contacts the outer cylindrical surface of the cylindrical wall of the rotor casing 7. Thus, the magnet unit 18 is fixedly mounted on the rotor casing 7 in such a manner that it embraces the cylindrical wall of the latter 7 and the first magnet 16 is surrounded by the second magnet 17. Thereafter, a magnetizing device is used to subject the inner cylindrical surface of the magnet unit 18 to magnetization for the purpose of driving the rotor, and the outer cylindrical surface and the lower end face (which appears as the upper end face in FIG. 2) thereof to magnetization for the purpose of generating a frequency signal. Thus, the formation of the magnet unit has been accomplished.

As was described above, in the embodiment shown in FIGS. 1 through 3, the magnet unit 18 is formed by laying on each other the first magnet made of a flexible bond magnet material which is anisotropic, and the second magnet made of a flexible bond magnet material which is isotropic. In addition, the second magnet 17 is smaller in wall thickness than the first magnet 16, and is confronted with the stator core 5 and the magneto-electric conversion element 10. Hence, the first magnet which is anisotropic can be readily magnetized with the aid of the ferromagnetic force for the purpose of driving the rotor, and the second magnet which is isotropic can be magnetized with a fine magnetizing pitch for the purpose of generating a frequency signal; that is, the resultant first and second magnets have their own satisfactory characteristics.

As was described above, the second magnet 17 is confronted with the stator core 5. And, the second magnet 17 is smaller in thickness the first magnet 16. Hence, the second magnet 17 will not interfere with the magnetic flux of the first magnet 17, so that the motor is able to provide a great driving force. As was described above, the second magnet 17 is magnetized for generating a frequency signal; however, it should be noted that the magnetization is made with a fine magnetizing pitch without use of the ferromagnetic force; that is, it will not affect the first magnet 16 at all. Thus, the FG output provided is high in accuracy.

Second and third embodiments of the invention will be described with reference to FIGS. 5 (a) and (b), respectively, in which parts corresponding functionally to those already described with reference to the first embodiment shown in FIGS. 1 through 3 are therefore designated by the same reference numerals or characters.

Figure 5A:
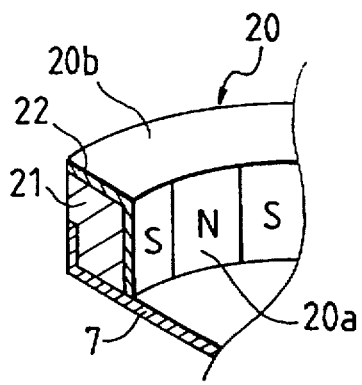
FIGS. 5 (a) and (b) are sectional views showing other examples of the brushless motor, which constitute second and third embodiments of the invention, respectively.
Figure 5B:
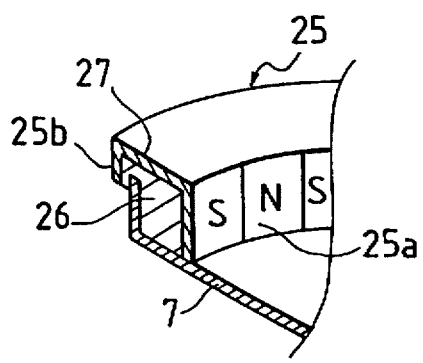

In the second embodiment, as shown in FIG. 5 (a), an annular magnet unit 20 made of a flexible bond magnet material is mounted on the cylindrical wall of the rotor casing 7. The magnet unit 20 comprises a first magnet 21 and a second magnet 22, and it is not protruded over the outer cylindrical surface of the cylindrical wall of the rotor casing 7. The second magnet 22 is smaller in thickness than the first magnet 21. The magnet unit 20 is magnetized from the side of the inner cylindrical surface 20a for the purpose of driving the rotor, which is confronted with the outer cylindrical surface of the stator (not shown). In addition, the magnet unit 20 is magnetized from the side of the lower end face 20b for the purpose of generating a frequency signal, which is confronted through a predetermined gap with the magneto-electric conversion element. The remaining structures are equal to those of the brushless motor shown in FIGS. 1 through 3.

In the third embodiment, as shown in FIG. 5 (b), a magnet unit 25 made of a flexible bond magnet material is mounted on the cylindrical wall of the rotor casing 7. The magnet unit 25 comprises a first magnet 26 and a second magnet 27. The second magnet 27 is smaller in wall thickness than the first magnet 26. The inner cylindrical surface 25a of the magnet unit 25 is magnetized for the purpose of driving the rotor, which is confronted through a predetermined gap with the stator (not shown). In addition, the magnet unit 20 has an annular protrusion 25b which is extended along the cylindrical wall of the rotor casing 7 from the lower end face of the magnet unit 25. The outer cylindrical surface of the annular protrusion 25b is magnetized for the purpose of generating a frequency signal, and is confronted through a predetermined gap with the magneto-electric conversion element. The remaining structures are equal to those of the brushless motor shown in FIGS. 1 through 3.

The second and third embodiments shown in the parts FIGS. 5 (a) and (b) have the same effects or merits as the first embodiment shown in FIGS. 1 through 3.

As was described above, in the brushless motor of the invention, the magnet unit is made of the flexible bond magnet material; more specifically, it is formed by laying on each other the first magnet which is anisotropic and can be readily magnetized with the aid of a ferromagnetic force and the second magnet which is isotropic and can be readily magnetized with a fine magnetizing pitch, and the second magnet is smaller in wall thickness than the first magnet. Hence, in the invention, the first magnet is magnetized with the ferromagnetic force for the purpose of driving the rotor, and the second magnet is magnetized with a fine magnetizing pitch for the purpose of generating a frequency signal. That is, the characteristic of the first magnet is suitable for driving the rotor, and that of the second magnet is suitable for generating a frequency signal. Hence, the resultant brushless motor is excellent in output characteristic and in FG characteristic, and can be manufactured with high efficiency.

In the brushless motor of the invention, although the second magnet is confronted with the stator core, the wall thickness of the second magnet is set to a predetermined value smaller than that of the first magnet. That is, the wall thickness of the second magnet can be so selected that the magnetic flux of the first magnet is scarcely affected by the second magnet. Hence, the brushless motor is able to provide a sufficiently high driving force.

In the invention, in the formation of the magnet unit, the mixture is used which is prepared by kneading the magnet material together with the epoxy resin material, and the magnet unit made of the mixture is subjected to heat treatment. Hence, the resultant magnet unit thus processed is scarcely deformed by the change in temperature. The epoxy resin material is employed for fixing the magnet unit.

What is claimed is:

1. A brushless motor comprising:

a magnet unit mounted on a rotor casing, said magnet being rotated together with said rotor casing; and a stator and a magneto-electric conversion element arranged confronted with said magnet unit, wherein said magnet unit is formed by laying on each other a first magnet made of a flexible bond magnet material which is anisotropic and a second magnet made of a flexible bond magnet material which is isotropic, and said second magnet has smaller wall thickness than said first magnet, and is confronted with said stator and said magneto-electric conversion element; and wherein said rotor casing includes a cylindrical wall, said first magnet is fixedly attached to said cylindrical wall of said rotor casing in such a manner that said first magnet is extended from the inner cylindrical surface thereof and folds over to the outer cylindrical surface thereof.

2. A brushless motor as claimed in claim 1, in which said magnet unit has an annular shape, having an inner cylindrical surface which is magnetized for driving a rotor and faces the stator, and an outer cylindrical surface which is magnetized for generating a frequency signal and faces a magneto-electric conversion element.

3. A brushless motor as claimed in claim 1, in which said flexible bond magnet material is mixed with an epoxy resin material.

4. A brushless motor as claimed in claim 1, in which said rotor casing includes a cylindrical wall, said first magnet is fixedly attached to said cylindrical wall of said rotor casing in such a manner that said first magnet is extended from the inner cylindrical surface thereof and folds over to the outer cylindrical surface thereof.

5. A brushless motor comprising:

a rotor driving magnet and a frequency generating magnet mounted on a rotor casing which is rotated together with a rotary shaft;

a stator core on which a drive coil is wound, said stator core being confronted with said motor driving magnet; and a magneto-electric conversion element arranged confronted with said frequency generating magnet, wherein said rotor driving magnet comprises a first flexible bond magnet material which is anisotropic, while said frequency generating magnet comprises a second flexible bond magnet material which is isotropic, said rotor driving magnet and said frequency generating magnet are fixedly mounted laid on said rotor casing in such a manner that said frequency generating magnet covers the outer surface of said first flexible bond magnet, and said frequency generating magnet is confronted with said magneto-electric conversion element, and said motor driving magnet is confronted through said second flexible bond magnet with said stator core.

6. A brushless motor as claimed in claim 5, in which said first and second flexible bond magnet materials are each prepared by adding a binder such as a rubber material or a binder having a rubber-like elasticity to a magnetic powder to a magnetic powder filling rate of 85 to 95%.

7. A brushless motor as claimed in claim 6, in which said frequency generating magnet has a smaller thickness than said rotor driving magnet.

8. A brushless motor as claimed in claim 7, in which the thickness of said second flexible bond magnet is in a range of from 0.1 mm to 0.5 mm.

9. A brushless motor as claimed in claim 5, in which said first and second flexible bond magnet materials are each prepared by adding at least one of a rubber material and a binder having a rubber-like elasticity to a magnetic powder to a magnetic powder filling rate of 85 to 95%, and at least one of said first and second flexible bond magnet materials is kneaded together with an epoxy resin material.

10. A brushless motor comprising:

a magnet unit mounted on a rotor casing, said magnet being rotated together with said rotor casing; and a stator and a magneto-electric conversion element arranged so as to be confronted with said magnet unit;

wherein said magnet unit comprises a circular anisotropic magnet and a circular isotropic magnet mounted concentrically on said rotor casing so that said isotropic magnet is covered with an anisotropic magnet so as to confront said stator and said magneto-electric conversion element, and wherein the thickness of said isotropic magnet is smaller than the thickness of said anisotropic magnet.

11. The brushless motor of claim 10, wherein said anisotropic magnet comprises an anisotropic flexible bond magnetic material and said isotropic magnet comprises an isotropic flexible bond magnetic material.

12. The brushless motor of claim 11, wherein each of said anisotropic magnet and said isotropic magnet comprises a binder and a magnetic powder with a powder filling rate of 85 to 95%.

13. A brushless motor as claimed in claim 12, wherein said binder has one of a rubber and a rubber-like elasticity.

14. A brushless motor as claimed in claim 10, wherein said isotropic magnet covers an anisotropic magnet so as to confront said stator and said magneto electric conversion element.

15. A brushless motor as claimed in claim 11, wherein said magnet unit has a drive magnet facing said stator and a position detecting magnet facing said magneto-electric conversion element.

16. A brushless motor as claimed in claim 11, wherein an epoxy resin material is mixed in at least one of said isotropic magnet and said anisotropic magnet.

* * * * *